United States Patent
Smith et al.

(10) Patent No.: US 7,946,253 B2
(45) Date of Patent: May 24, 2011

(54) PET GROOMING STAND

(75) Inventors: Brian W. Smith, Sterling, IL (US); Scott A. Melton, Erie, IL (US); Michael Eddinger, Rock Falls, IL (US); Keith W. Dirks, Sterling, IL (US)

(73) Assignee: Wahl Clipper Corporation, Sterling, IL (US)

( * ) Notice: Subject to any disclaimer, the term of this patent is extended or adjusted under 35 U.S.C. 154(b) by 374 days.

(21) Appl. No.: 11/809,994

(22) Filed: Jun. 4, 2007

(65) Prior Publication Data

US 2007/0295285 A1    Dec. 27, 2007

Related U.S. Application Data

(60) Provisional application No. 60/811,029, filed on Jun. 5, 2006.

(51) Int. Cl.
*A01K 1/04* (2006.01)
(52) U.S. Cl. .................................................... 119/756
(58) Field of Classification Search .......... 119/753–757, 119/600, 797; 5/603; 312/229; 108/25
See application file for complete search history.

(56) References Cited

U.S. PATENT DOCUMENTS

| | | | | |
|---|---|---|---|---|
| 2,829,622 | A * | 4/1958 | Borthwick | 119/757 |
| 3,145,692 | A * | 8/1964 | Litwiller | 119/753 |
| 3,208,432 | A | 9/1965 | Fisk | |
| 3,524,434 | A | 8/1970 | Finley | |
| 3,806,109 | A * | 4/1974 | Weber et al. | 5/610 |
| 4,073,240 | A * | 2/1978 | Fly | 108/20 |
| 4,509,461 | A | 4/1985 | Peck | |
| RE32,052 | E * | 12/1985 | Rosenberg et al. | 119/756 |
| 4,558,847 | A * | 12/1985 | Coates | 254/9 C |
| 4,570,577 | A * | 2/1986 | Bellinger | 119/725 |
| 4,594,747 | A * | 6/1986 | Dempsey | 15/301 |
| 4,828,210 | A * | 5/1989 | Anderson et al. | 248/229.15 |
| 5,193,487 | A * | 3/1993 | Vogel | 119/671 |
| D368,189 | S * | 3/1996 | Bro et al. | D6/480 |
| 5,513,598 | A | 5/1996 | Zapparoli | |
| 5,960,746 | A | 10/1999 | Salts | |
| 6,516,753 | B1 | 2/2003 | Taylor | |
| 6,647,899 | B1 * | 11/2003 | Lysien | 108/24 |
| 7,013,839 | B2 | 3/2006 | Lynch | |
| 7,073,464 | B2 * | 7/2006 | Keil | 119/753 |
| 7,357,098 | B2 * | 4/2008 | Foster | 119/673 |
| 2007/0039559 | A1 * | 2/2007 | Foster | 119/676 |

* cited by examiner

*Primary Examiner* — Joshua J Michener
*Assistant Examiner* — Brian M O'Hara
(74) *Attorney, Agent, or Firm* — Greer, Burns & Crain, Ltd.

(57) ABSTRACT

A grooming stand includes a base, a platform with at least one peripheral surface, and at least one leg extending between the base and the platform. A gutter is disposed around a portion of the peripheral surface of the platform. The gutter is configured to receive clippings from the animal.

12 Claims, 4 Drawing Sheets

PET GROOMING STAND

CROSS-REFERENCE

This application claims priority from U.S. provisional patent application Ser. No. 60/811,029 filed Jun. 5, 2006, which is incorporated herein by reference.

BACKGROUND OF THE INVENTION

The present invention relates generally to improvements to grooming stands for pets. More particularly, the present invention relates to a grooming stand for pets that provides storage for grooming devices.

Pet grooming stands that are constructed to enable a user to easily groom a pet are known in the art. Such stands typically include an elevated platform with a tether mechanism extending over the top of the platform to restrain the pet from leaving the platform.

A problem faced by the user is that it is difficult to keep the work area organized. Some users of a pet grooming stand, particularly professional animal groomers, have multiple hair cutting tools. The tools can include multiple types and sizes of brushes, hair clippers and/or trimmers. In addition, the user typically has leashes, treats and other animal paraphernalia. Typically, the user will put these tools and animal paraphernalia on a flat space such as a nearby counter top, which can quickly become disorganized.

Another problem faced by the user is that the tools are not readily accessible to the user. It can be appreciated that the user may have to frequently exchange tools while paying mind to an uncooperative animal. When the tools are on a nearby countertop or elsewhere, the user may have to take their attention off the animal in order to retrieve the tools. Not only is time wasted in searching for the correct tool, but the animal can become anxious or nervous in the user's absence.

Accordingly, there is a need for an improved grooming stand for pets that provides organization of grooming related items, such as those identified above, for the user. Further, there is a need for an improved grooming stand for pets that provides enhanced accessibility of tools to the user.

BRIEF SUMMARY OF THE INVENTION

The present grooming stand for pets meets or exceeds the above-identified needs. The grooming stand provides receptacles configured for receiving the various items required for grooming. Further, the grooming stand is adjustable in height to accommodate a range of different animal sizes. Additionally, the grooming stand facilitates the easy removal of clippings or other debris.

Specifically, the present grooming stand includes a base, a generally horizontal platform with at least one peripheral surface, and at least one leg extending between the base and the platform. A gutter is disposed around a portion of the peripheral surface of the platform. The gutter is configured to receive clippings from the animal.

A tether support for an animal grooming stand having a platform for supporting the animal includes a rigid member having a first portion extending generally transversely to the platform, and a second portion extending generally parallel to the platform. The rigid member has a distal end. A leash member is coextensive with the rigid member, and the leash member extends beyond the distal end. A tether clamp is disposed on the first portion for receiving the leash member and for adjusting the length of extension of the leash member from the distal end.

DETAILED DESCRIPTION OF THE INVENTION

Figure 1:
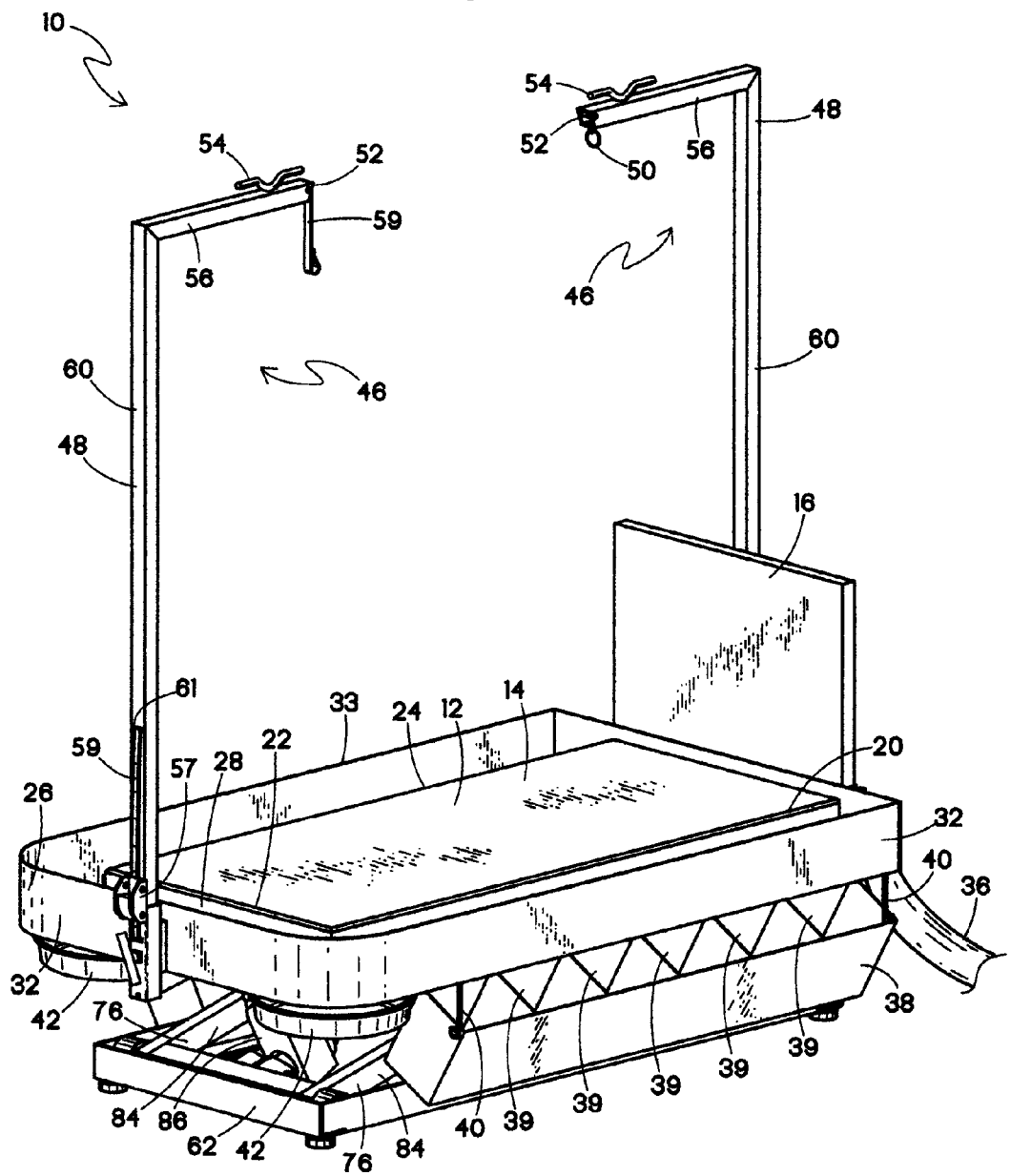
FIG. 1 is a top perspective view of the present grooming stand in a lowered position.
Figure 3:
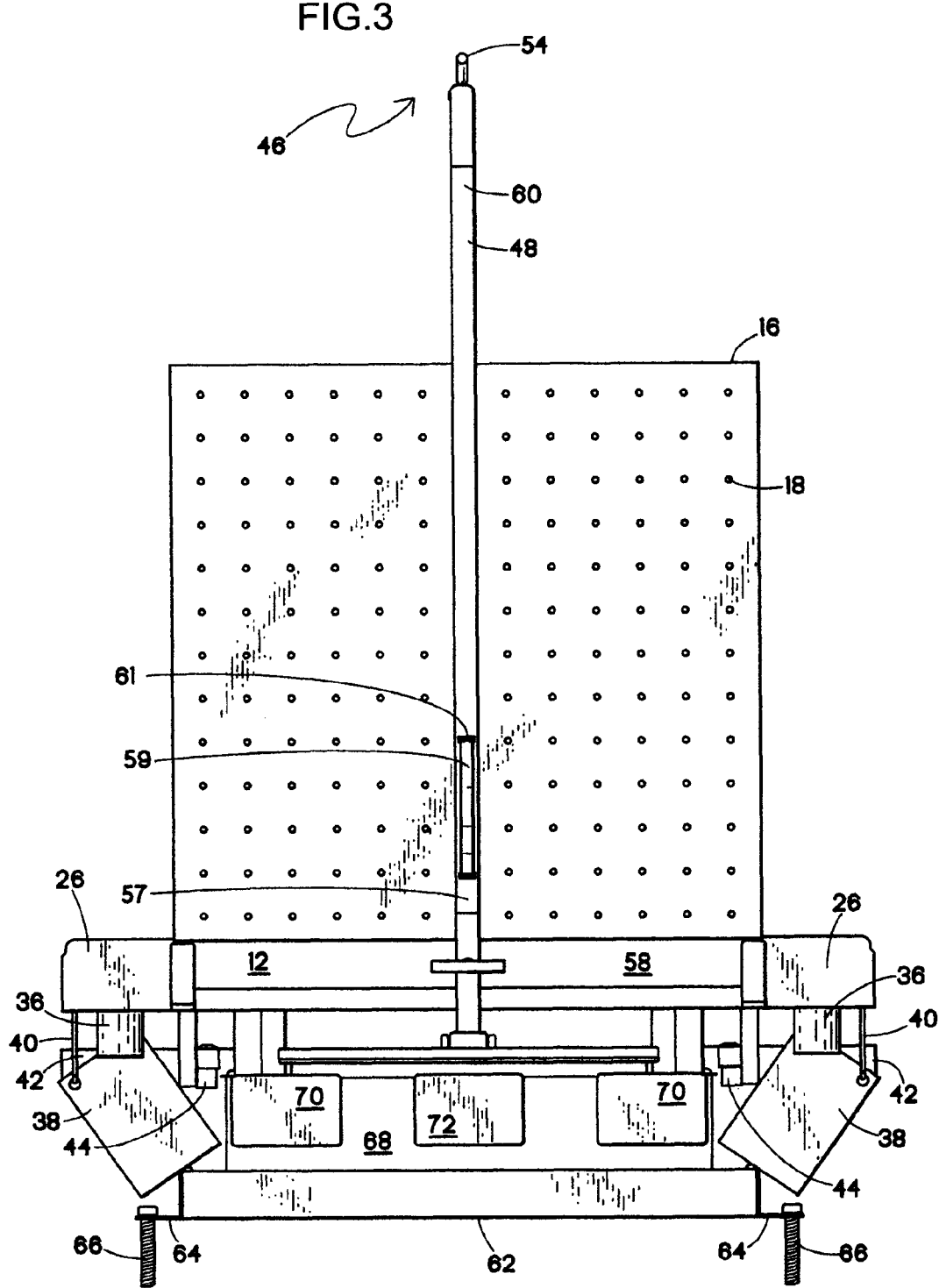
FIG. 3 is a rear view of the pet grooming stand of FIG. 1.

Referring to FIGS. 1 and 3, the present grooming stand, generally designated 10, is shown in a retracted or lowered position. The grooming stand 10 includes a platform 12 preferably made of a rigid material that is configured to accommodate the size and weight of a dog, or any other animal requiring grooming services. In the preferred embodiment, the platform 12 is generally rectangular, having a dimension of approximately 24 inches by 42 inches, however other sizes and shapes of platforms may be used. Further, a top surface 14 of the platform 12 is preferably made of a water-resistant material. In addition, the top surface 14 of the platform 12 may be provided with a gripping material (not shown) to prevent the animal from slipping off the platform. In the preferred embodiment, the top surface 14 is made of rubber or a rubber-like material.

The grooming stand 10 also includes a sidewall 16 extending generally transversely from the platform 12. The sidewall 16 preferably includes a series of holes 18, or alternatively is manufactured of pegboard, to receive and store tools and accessories at the sidewall, such as with hangers inserted into the holes. Additionally, the sidewall 16 forms a backstop for the pet being groomed.

Figure 2:
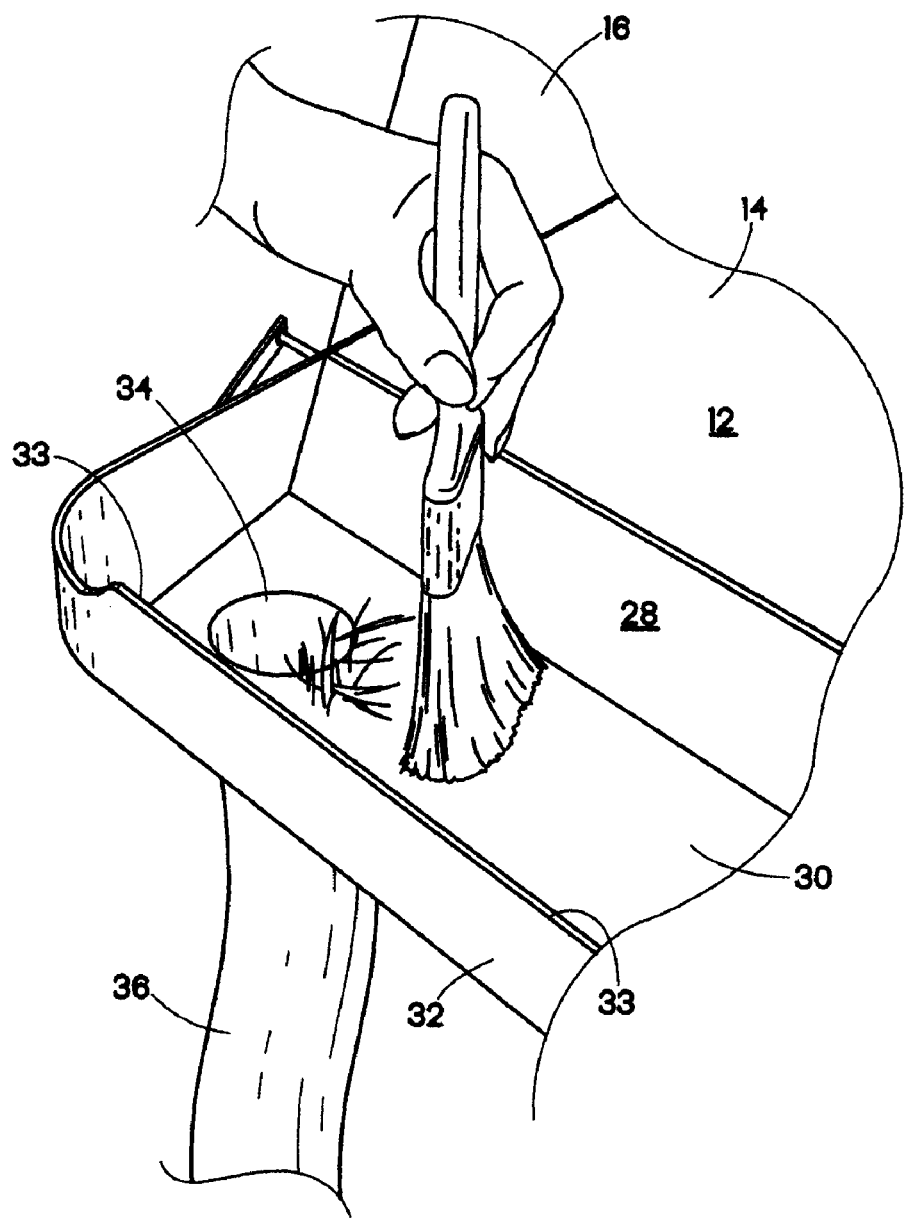
FIG. 2 is a partial perspective view of a gutter system of the grooming stand of FIG. 1.

Referring now to FIGS. 1 and 2, preferably extending around the platform 12 from a right side peripheral wall 20, to a front side peripheral wall 22, and further, to a left side peripheral wall 24 of the platform 12 is a generally "U"-shaped gutter 26. The gutter 26 includes an inner channel wall 28, a bottom channel wall 30 and an outer channel wall 32, and is preferably made of a material having a smooth surface, such as plastic. In the preferred embodiment, the outer channel wall 32 has an upper surface 33 that is higher than the platform 12.

The gutter 26 at least partially surrounds the platform 12 and is configured to collect the clippings of the groomed animal that are not caught by the platform. Further, the clippings that fall onto the platform 12 can be swept into the gutter 26 by the user.

At least one port 34 is located in the gutter 26, preferably at the bottom channel wall 30, and a vacuum tube 36 can be connected to the port to receive the clippings and to a source of suction, such as a vacuum cleaner (not shown). The user of the grooming stand 10 can push the clippings toward the port 34 where the vacuum tube 36 will remove the clippings, reducing clean-up time. Alternately, the clippings can be gravity fed to a receptacle, such as a collection bag, located under the port 34.

Preferably hanging from the gutter 26 on at least one peripheral side 20, 22, 24, 58 of the platform 12 is at least one storage bag 38 configured to receive and store the tools and accessories (see FIG. 1). The storage bag 38 preferably includes a plurality of compartments 39. In the preferred embodiment, two storage bags 38 each having a plurality of compartments 39 hang from the grooming stand 10 at the first and second peripheral sides 20, 24 of the gutter 26 such that the compartments are accessible to the user to the side of and beneath the gutter 26. Hangers 40 are preferably used to support the storage bags 38 at an outer side of the storage bags at both ends of the storage bag. Further, the storage bags 38 are preferably made of canvas, plastic, or vinyl, or any other durable material. Alternatively, the storage bags may be rigid.

At least one storage container 42 preferably depends from a peripheral side 20, 22, 24, 58 of the platform 12. The storage container 42 is preferably generally circular and is preferably rotatably attached to the grooming stand 10 in a "lazy susan" configuration at hinged pivot structure 44 (FIG. 3). Further, the storage container 42 may swing out from under the platform 12 from a storage position to expose more of the storage container in a use position.

In the preferred embodiment, two "lazy susan"-type storage containers 42 are rotatably disposed on separate pivot structures 44 of the grooming stand 10 and are accessible to the user from the front of and beneath the gutter 26. It is contemplated that other types of storage containers 42 can be substituted for the "lazy susan" configuration, and further, that the storage containers can be located at other locations on the grooming stand 10.

To restrain the animal on the platform 12, the pet-grooming stand 10 includes at least one, and preferably two tether mechanisms 46 disposed on a tether support, such as an L-bracket 48. The improved tether mechanism 46 includes at least one standard tether eyelet 50 disposed at a distal end 52 of the L-bracket 48, and/or at least one halter tie-off 54 disposed on a short leg 56 of the L-bracket.

Referring to FIGS. 1 and 3, the tether mechanism 46 also includes an adjustable tether clamp 57 that is disposed on the grooming stand 10 in proximity to the L-bracket 48. The tether clamp 57 is preferably a spring-loaded one-way latch which allows a leash 59 to be pulled tighter, through a hole 61 in the L-bracket 48, through the hollow interior of the L-bracket, and from the distal end 52. Inside the L-bracket opening at the distal end 52, there is a horizontally disposed bar configured to support the leash to prevent the leash from chafing against the distal end 52. To loosen the leash 59, the tether clamp 57 must be depressed by the user. With the tether clamp 57, the leash 59 can be adjusted without having to adjust the L-bracket 48 for each individual animal, saving time for the groomer.

Referring to FIG. 3, the L-bracket 48 is attached to the platform 12 at a rear peripheral side 58 of the platform. A long leg 60 of the L-bracket 48 preferably extends generally parallel to the sidewall 16 and has a length exceeding at least the length of the sidewall. Alternatively, it is contemplated that the fixedly mounted L-bracket 48 of the present invention can be replaced with a telescoping bracket to adjust the height of the tether mechanism 46 with respect to the platform 12.

Figure 4:
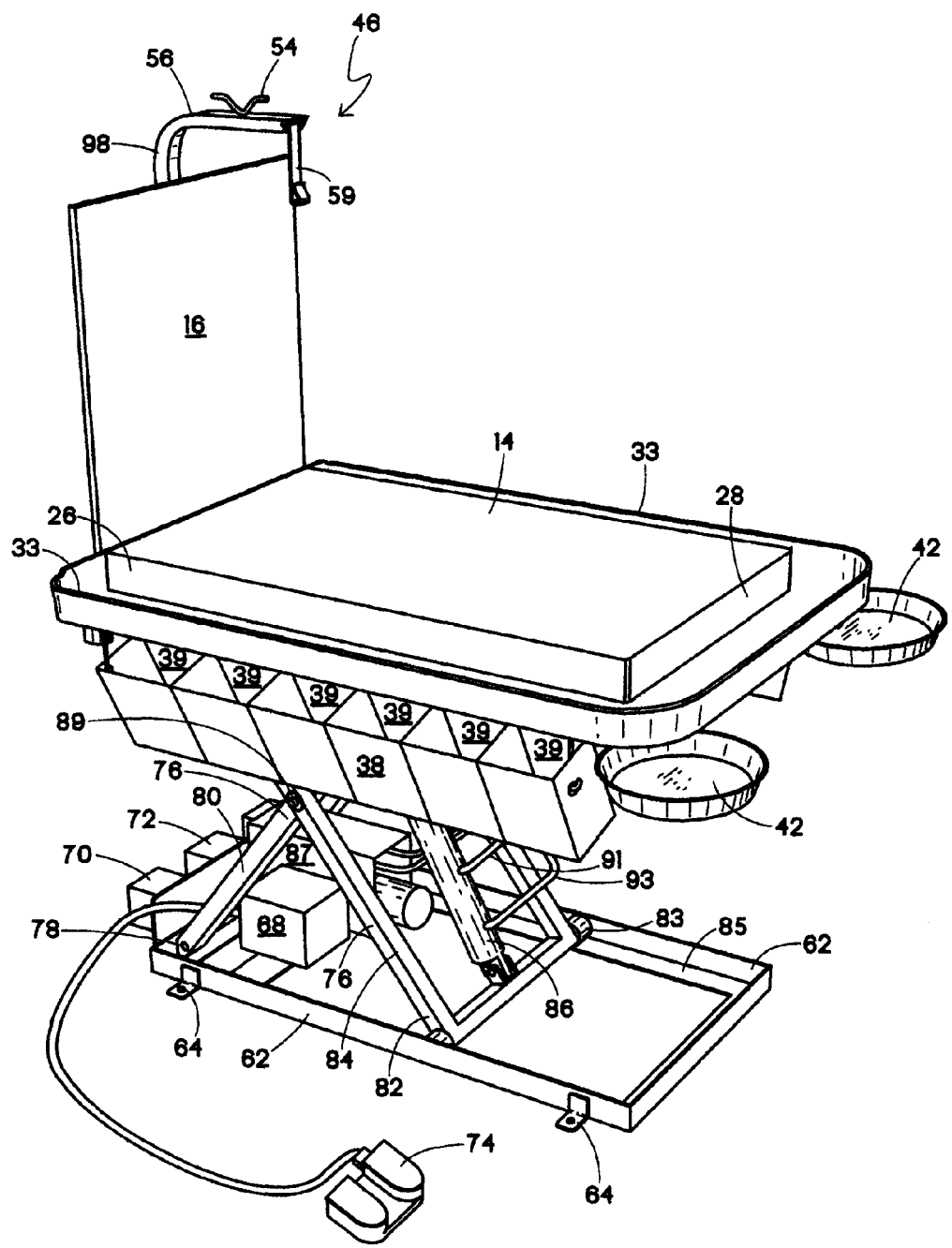
FIG. 4 is a top perspective view of the present grooming stand in a raised position.

As seen in FIGS. 1, 3 and 4, a base member 62 is disposed generally parallel to the platform 12 and is configured to contact the floor or other substrate. In the preferred embodiment, the base 62 is a rectangular, metal frame having substantially the same length and width dimensions as the platform 12. Preferably extending from the base member 62 are fastener receivers 64. The fastener receivers 64 are preferably brackets configured to receive a safety stop or fastener 66, such as a threaded bolt or the like. When a fastener 66 is received in the fastener receiver 64, the fastener is configured to fix the grooming stand 10 to the floor or other substrate. Alternatively, casters or adjustable rubber feet can be placed onto the fasteners 66 (or used instead of the fasteners) to level the base member 62.

Preferably located at the base 62 is an electrical box 68. The electrical box 68 is configured to be in electrical connection with a power source (not shown) at the location of use of the grooming stand 10. At least one outlet receptacle 70 is disposed in electrical connection with the electrical box 68 to receive plugs of the grooming tools. The outlet receptacles 70 provide convenient tool cord management at the grooming stand 10.

A foot control cord box 72 is also preferably in electrical connection with the electrical box 68. The foot control cord box 72 is preferably also a junction box for the cord that plugs into a power source outlet (not shown). The foot control cord box 72 is configured to receive the plug of a foot pedal 74 (FIG. 4) used to raise and lower the height of the platform 12. It is contemplated a plurality of foot pedals 74 can be received in the foot control cord box 72 to allow foot pedals to be placed on more than one side of the grooming stand 10. With additional foot pedals 74, the user does not have to relocate to adjust the height of the platform 12.

The base 62 is connected to the platform 12 using legs 76. In the preferred embodiment, the legs 76 are scissor-type legs that are configured to raise and lower the platform 12 with respect to the base 62. Preferably, a first end 78 of a first set of legs 80 are fixed to the base 62 and a first end 82 of a second set of legs 84 are moveable with respect to the base using rollers or guide members 83 engaging a track 85 on the base 62. The second set of legs 84 pivot with respect to the first set of legs 80 at a pivot point 89.

The legs 76 are preferably actuated with an actuator 86 to slide the first end 82 of the second set of legs 84 along the base 62 to raise and lower the platform 12. The actuator 86 is preferably operated by a motor 87, which is preferably mounted at the base 62. Alternatively, the motor 87 may be mounted beneath the platform 12.

Preferably, the actuator 86 is a double-acting cylinder that receives fluid from fluid lines 91, 93 to actuate a piston (not shown). As fluid is introduced into the actuator 86 on one side of the piston through line 91, fluid exits the actuator on the second side of the piston through line 93, and the piston extends. As the piston extends, the second set of legs 84 move along the track 85 on the base 62 away from the first set of legs 80. When fluid is introduced to the second side of the piston through line 93, fluid exits from the first side of the piston through line 91, and the piston retracts. As the piston retracts, the second set of legs 84 move towards the first set of legs 80 on the track 85. It is contemplated that any type of actuator 86 can be used, for example an actuator where the motor 87 turns a threaded rod (not shown) to extend in length.

Preferably, the legs 76 are made of metal and are of sufficient strength to support the weight of the grooming stand 10 and the animal being groomed. In the preferred embodiment, the platform 12 sits at approximately 11 inches off the ground when it is lowered, and can be raised to approximately 45 inches off the ground, however other heights are contemplated.

In operation, the animal is placed on the platform 12, preferably when the platform is in a lowered position. The collar of the animal is tethered to the tether mechanism, preferably by attaching the collar to the leash 59 that is received by the tether mechanism 46. Preferably by operating the foot pedal 74, the user raises the platform 12 to a height suitable for the user to groom the animal. The user pulls the leash taut at the adjustable tether clamp 57 to restrain the animal. During grooming, the user preferably uses the various compartments 39 of the storage bag 38 and the storage container 42 to store tools required for grooming the animal. After the animal is groomed, the clippings are preferably collected at the gutter 26, where it can be fed into the port 34. Preferably, a source of suction sucks the clippings down a vacuum tube 36.

While a particular embodiment of the present grooming stand has been described herein, it will be appreciated by those skilled in the art that changes and modifications may be made thereto without departing from the invention in its broader aspects.

The invention claimed is:

1. An animal grooming stand, comprising:
    a base;
    a generally horizontal platform having a peripheral surface;
    at least one leg extending between said base and said platform wherein said at least one leg is actuated by an actuator to move said platform vertically with respect to said base;
    a gutter disposed around at least a portion of said peripheral surface of said platform, said gutter being configured to receive clippings from the animal;
    a non-foldable L-shaped tether support having a first tether portion extending generally transversely upward from the platform, said first tether portion being hollow, and a second tether portion extending generally parallel to the platform, said second tether portion being hollow and having a distal end;
    a leash coextensive within said hollow second tether portion and extending out from said distal end at a first opening, said leash being exposed to the exterior of said tether support at a second opening on said first tether portion and being generally coextensive within the first tether portion and the second tether portion, wherein said leash enters said tether support at said first opening and exits said tether support at said second opening, and wherein between said first opening and said second opening, said leash is disposed entirely within said tether support at said hollow second tether portion and said hollow first tether portion; and
    a tether clamp disposed on an external surface of said first tether portion, said tether clamp receiving and adjusting the length of extension of said leash.

2. The animal grooming stand of claim 1 wherein said platform is generally rectangular, and said gutter is disposed around three peripheral sides of said platform.

3. The animal grooming stand of claim 1 wherein said gutter includes at least one gutter surface, and said gutter surface has a port for receiving the clippings.

4. The animal grooming stand of claim 3 further comprising a vacuum tube to connect said gutter to a source of suction for receiving the clippings.

5. The animal grooming stand of claim 1 further comprising at least one storage bag suspended from said gutter, and configured to receive and store pet grooming tools and accessories.

6. The animal grooming stand of claim 5 wherein said at least one storage bag includes a plurality of compartments.

7. The animal grooming stand of claim 1 further comprising a sidewall extending generally transversely from said platform.

8. The animal grooming stand of claim 1 further comprising at least one storage container rotatably attached to the stand and extending outwardly from said peripheral surface from a storage position to a use position.

9. The animal grooming stand of claim 1 wherein said tether clamp is a spring-loaded one-way latch that clamps said leash against said external surface.

10. An animal grooming stand, comprising:
    a base; a generally horizontal platform having a peripheral surface;
    at least one leg extending between said base and said platform, said at least one leg is actuated by an actuator to move said platform vertically and parallel with respect to said base, wherein said actuator is a cylinder extending between said leg and said platform;
    a gutter disposed around at least a portion of said peripheral surface of said platform, said gutter being configured to receive clippings from the animal;
    at least one storage bag suspended from said gutter, said at least one storage bag configured to receive and store pet grooming tools and accessories;
    and at least one tether support having a general L shape, said tether support having a first tether portion extending generally transversely to the platform, and a second tether portion extending generally parallel to the platform, at least a portion of said first and second tether portions being hollow;
    a leash coextensive within said hollow portions of said first tether portion and said second tether portion, said leash extending out an opening in said first tether portion to be exposed, and said leash extending out an opening in the second tether portion to be exposed; and
    a tether clamp disposed on an external surface of said first tether portion for receiving said leash and fixedly adjusting the length of extension of said leash from said opening in the second tether portion, wherein said tether clamp is a spring-loaded one-way latch that clamps said leash against said external surface.

11. The animal grooming stand of claim 10 wherein said gutter includes at least one gutter surface, and said gutter surface has a port connected to a vacuum tube for receiving the clippings.

12. An animal grooming stand, comprising:
    a base;
    a generally horizontal platform having a peripheral surface;
    at least one leg extending between said base and said platform, said at least one leg is actuated by an actuator to move said platform vertically and parallel with respect to said base, wherein said actuator is a cylinder extending between said leg and said platform;
    a gutter disposed around at least a portion of said peripheral surface of said horizontal platform, said gutter being configured to receive clippings from the animal, said gutter including an inner channel wall defining said peripheral surface of said platform, a bottom channel wall that is disposed at a height below the height of said platform, and an outer channel wall;
    a tether support extending transversely from said platform at a first side, at least a portion of said tether support being hollow;
    a leash coextensive within said at least one hollow portion of said tether support, said leash extending out a first opening to be exposed, and said leash extending out a second opening to be exposed; and
    a tether clamp disposed on an external surface of said tether support for receiving said leash and fixedly adjusting the length of extension of said leash from said second opening, wherein said tether clamp is a spring-loaded one-way latch that clamps said leash against said external surface; and
    a sidewall extending generally transversely from said platform at said first side.

* * * * *